United States Patent [19]

Tharman

[11] Patent Number: 4,684,917
[45] Date of Patent: Aug. 4, 1987

[54] LOW OIL WARNING CIRCUIT

[75] Inventor: Paul A. Tharman, Milwaukee, Wis.

[73] Assignee: Briggs & Stratton Corporation, Wauwatosa, Wis.

[21] Appl. No.: 863,791

[22] Filed: May 16, 1986

[51] Int. Cl.⁴ .............................................. B60Q 1/00
[52] U.S. Cl. ................................ 340/59; 123/196 S; 123/198 D; 340/612; 340/618
[58] Field of Search ............... 340/612, 614, 620, 623, 340/618, 59, 60; 123/196 S, 198 D

[56] References Cited

U.S. PATENT DOCUMENTS 2,722,673 11/1955 Turner .............................. 340/60 X
4,054,117 10/1977 Palmer et al. .................. 123/198 D Primary Examiner—James L. Rowland
Assistant Examiner—Daniel Myer
Attorney, Agent, or Firm—Andrus, Sceales, Starke & Sawall

[57] ABSTRACT

An ignition powered indicator system for detecting and audibly alerting an operator of a low oil condition associated with an internal combustion engine for apparatus such as a lawn mower, pump, generator, tractor and the like. The indicator system includes a low oil switch mounted on the engine crankcase housing and connected in circuit with a buzzer, diode, and capacitor with the ignition primary. When the oil level is too low, the switch closes shorting the ignition primary to shut off the engine and produce an intermittent beeping sound, namely, one beep per ignition pulse, alerting the operator of the low oil condition.

6 Claims, 2 Drawing Figures

LOW OIL WARNING CIRCUIT

BACKGROUND OF THE INVENTION

The present invention relates to indicator systems for detecting and alerting an operator of the operating condition of a desired function associated with a power driven apparatus, and more particularly to an indicator system for detecting and alerting an operator of a low oil condition for apparatus such as lawn mowers, pumps, generators, tractors and the like having an internal combustion engine.

Various types of indicator systems are wellknown in the art and are employed to visually display and/or audially alert an operator of the condition of a particular function associated with an apparatus. For example, such indicator systems may be utilized to indicate the operating condition of various components associated with power driven apparatus employing internal combustion engines such as lawn mowers, pumps, generators, tractors and the like. Such indicator systems including appropriate sensors are used to display conditions such as low oil, low battery voltage, low fuel, high engine temperature, high oil temperature, headlights on, engine on, choke on, transmission in reverse, cutting blade turning as well as other desired functions associated with such apparatus. Typically, however, such indicator systems employ light bulbs or other lighted displays which have the disadvantage of not being clearly visible in sunlight where these types of apparatus are generally employed.

It is thus desirable to incorporate an indicator system for power driven apparatus of the above described type for detecting a low oil condition, and warning an operator of such condition. Detection and warning of such an abnormal condition is clearly important due to the catastrophic results should such condition remain uncorrected for any length of time for an operating engine.

SUMMARY OF THE INVENTION

An ignition-powered indicator system for detecting a low oil condition and warning an operator of such condition for power-driven apparatus such as a lawn mower, pump, generator, tractor and the like having an internal combustion engine that includes an ignition system having a main core that supports a primary winding and a secondary winding.

The ignition-powered indicator system includes indicator means in the form of audio means that is connected in circuit with the primary winding and actuatable to indicate a low oil condition for the power driven apparatus. Sensor switch means for sensing the amount of oil for the apparatus is connected in circuit with the indicator means and the primary winding to actuate the indicator means in response to an undesirable low level of oil for the power driven apparatus.

The indicator means may be a buzzer or other audio device connected in circuit between the primary winding and the sensor switch means. The buzzer or audio device is typically located on the dashboard or operator's panel. The buzzer or audio device is connected across the terminals of a capacitor which functions to increase or lengthen the time voltage is applied across the buzzer or other audio device so that the buzzer or audio device can be heard by the operator. A diode is incorporated between the audio device and primary winding for rectifying the current. The sensor switch means may be of any type which senses the level of oil in the engine crankcase and trips when the oil level in the engine crankcase decreases to an undesirably low amount. The sensor switch means is connected in circuit with the audio device, and may be mounted on the engine crankcase housing at any convenient location.

The above circuitry intermittently actuates the audio device and thus produces a beeping sound which alerts the operator of a low oil condition. In order to accomplish this, the ignition primary pulse, which is mainly negative, is shorted through the diode, capacitor and switch to ground when the switch contacts close indicating that the level of oil is too low. Grounding of the ignition primary thus shuts down the engine. On the way down, the audio device intermittently produces loud beeps which can be heard above the engine noise thus indicating to the operator of the low oil condition. The above circuitry produces a single beep for every ignition pulse i.e. one beep per revolution. Additionally, if the operator attempts to restart the engine by pulling a starting rope or cranking a starter motor, there will be a beep for each revolution of the engine, and although the engine will not start, the operator will immediately become aware of the low oil condition. Upon replenishing the oil in the engine crankcase, the low oil switch opens thus opening the above described circuit and allowing normal engine-operation.

The indicator system of the present invention is connected to the primary winding of the ignition system and is thus ignition powered instead of battery powered. Thus, the present indicator system eliminates the driving circuits and other components typically employed with battery powered indicators, such as LCD panels. Also, since the present indicator system is ignition powered there is no need for a battery, and therefore the present system may be utilized with both battery powered as well as non-battery powered apparatus such as those incorporating breakerless magneto ignition systems or magneto systems using points.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
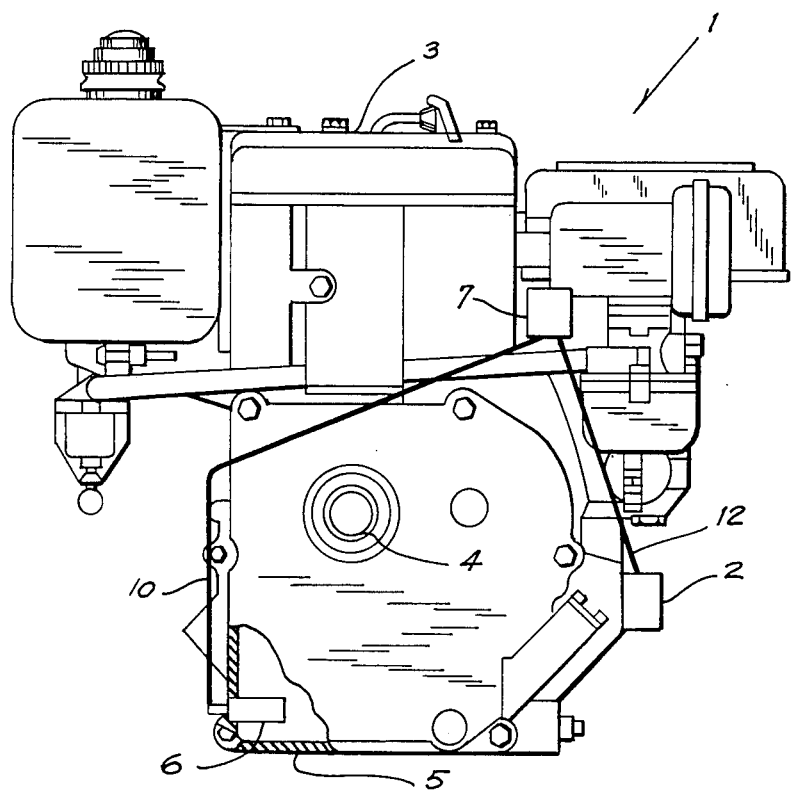
FIG. 1 is a schematic illustration of a generator incorporating the ignition powered indicator system of the present invention.
Figure 2:
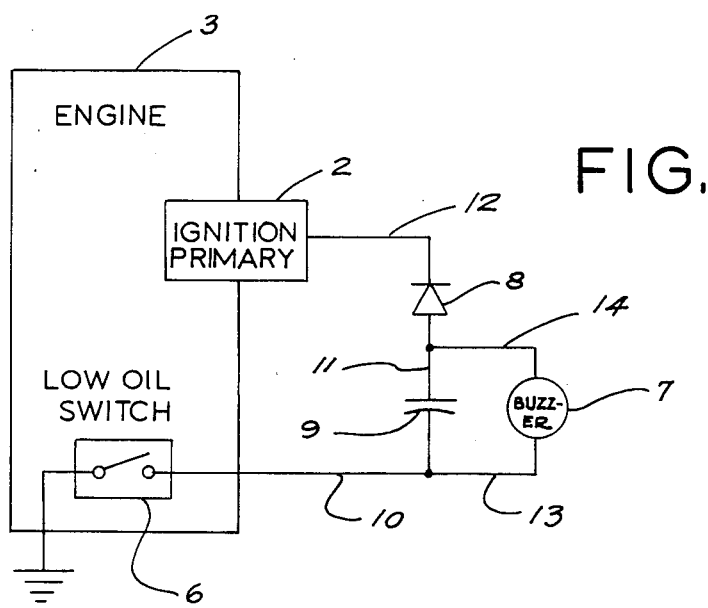
FIG. 2 is a schematic illustration of the circuit diagram for the indicator system of FIG. 1.

Referring now to the drawings, FIGS. 1 and 2 illustrate the principles of the invention as applied to a breakerless magneto ignition system for a single cylinder internal combustion engine that drives a generator, generally designated by the numeral 1. Although the principles of the invention are illustrated as being applied to magneto ignition systems of the type employed with small engines used for powering tractors, lawn mowers, pumps, electrical generators, snow blowers and the like, the principles of the invention are equally adaptable to battery powered ignition systems for such apparatus.

The ignition system illustrated includes a conventional magneto armature (not shown) having an induction core consisting of a primary winding, generally designated by the numeral 2, with a relatively small number of turns of relatively coarse wire and a secondary winding (not shown) having numerous turns of relatively fine wire that are inductively coupled with noe another by means of a ferromagnetic core (not shown) on which they are both wound, in a convention manner. A spark plug (not shown) is connected across the terminals of the secondary winding. Although the principles of the invention are illustrated as being applied to a single cylinder internal combustion engine having only a single spark plug, implying that the ignition apparatus is intended for a single cylinder engine, there could obviously be a plurality of plugs successively connectable with the secondary winding in a known manner by means of a conventional distributor for use with a multi-cylinder engine.

To provide for firing a spark plug, a circuit is closed that permits current to flow in the primary winding. That circuit remains closed at least long enough for current flow in the primary winding to attain its full value, and is abruptly opened at the time the spark plug is to be fired, to effect a rapid collapse fo the flux field that had been induced in the core by such current flow. The collapsing flux induces across the secondary winding a voltage high enough to produce an arc across the electrode to the spark plug, in the conventional manner.

In the operation of the present invention, which is incorporated in a single cylinder engine having a breakerless magneto ignition system, the operation of the magneto requires that a circuit between the terminals of the primary winding be closed and opened by switching means operating in properly timed relation to the engine cycle. In the apparatus of the present invention, the mechanically actuated breaker points for controlling the flow of current to the primary are replaced by electronic switching means comprising a transistor device (not shown) and a small biasing coil (not shown) wound around a second ferromagnetic core (not shown). The biasing coil and its corresponding second core cooperate with a permanent magnet assembly carried for orbital motion on a fly wheel mounted on the engine crankshaft which rotates in timed relation to the engine cycle. The operation of the transistor device and biasing coil in cooperation with armature core and permanent magnet assembly carried by the flywheel of the engine is described in detail in U.S. Pat. No. 4,270,509 to Paul A. Tharman the subject matter of which is specifically incorporated herein by reference.

Typically, generator 1 includes an internal combustion engine 3 having a crankshaft 4 and a crankcase 5 containing oil or other lubricant for engine 3.

FIGS. 1-2 illustrate the indicator system of the present invention. The indicator system is ignition powered and indicates a low oil condition in crankcase 5 so that an operator may be alerted to an abnormally low level of oil in order to prevent catastrophic engine failure. The indicator system illustrated includes indicator means in the form of audio means actuatable to indicate the low level of oil in crankcase 5, and sensor switch means for detecting the low level of oil in crankcase 5 and actuating the indicating means.

The sensor switch means for the indicator system comprises an on/off switch 6, which may be of any conventional type, and is typically of the float type having contacts which open when the level of oil is adequate and close when the level of oil is inadequate or too low. Switch 6 is of the type available from Kelsey-Hayes of Detroit, Mich. As shown in FIG. 1, switch 6 is mounted on the side wall of crankcase 5 and extends into crankcase 5 in order to sense the oil level within the crankcase 5.

The indicator means comprises an audio means such as buzzer 7. Preferably, buzzer 7 is of the type available from Mallory of Indianapolis, Ind. under Model No. MCP320B2. The indicator means also includes a diode 8 for rectifying the current from primary 2. Diode 8 may, for example, be a 1 amp 100 volt IN4001 available from the Motorola Co. or from the General Instrument Co. Finally, the indicator means may include a capacitor 9 connected in circuit with buzzer 7 and diode 8. Capacitor 9 typically comprises a 47 microarad, 25 volt capacitor of the type available from Nichion of Japan, under Model No. ULBIE 470MAA. Diode 8 and capacitor 9 may be potted directly onto the back of buzzer 7 for protection from physical damage.

As shown schematically in FIG. 2, one side of switch 6 is connected to ground while the other side of switch 6 is connected via a wire 10 to one terminal of capacitor 9 while the negative terminal of capacitor 9 is connected via wire 11 to the anode terminal of diode 8. The cathode terminal of diode 8 in turn is connected by a wire 12 to the ignition primary 2. One side of buzzer 7 is connected via wire 13 to wire 10 while the other side of buzzer 7 is connected via wire 14 to wire 11 with the result that buzzer 7 is connected in parallel circuit with capacitor 9. As noted, diode 8 rectifies the current between primary 2 and switch 6 so that current flows only from switch 6 to primary 2 during the negative portion of the ignition pulse, and prevents current flow from primary 2 to switch 6 during the positive portion of the ignition pulse. Since the ignition pulse is of extremely short duration i.e. one millisecond, there is insufficient time for voltage to flow across buzzer 7 to permit buzzer 7 to react to the current flow so it can be heard by an operator. Therefore, capacitor 9 function to lengthen or increase the amount of time voltage is across buzzer 7 so that buzzer 7 may be heard by the operator.

In operation, when the amount of oil in crankcase 5 decreases to an undesired amount, being indicative of an undesirably low lubrication level for engine 3, the contacts of switch 6 close to complete the above described circuit to actuate buzzer 7. To accomplish this, the ignition primary 2, which is mainly negative, is shorted through diode 8, capacitor 9 and switch 6 to ground. Once primary 2 is shorted, engine 3 shuts down. On the way down, buzzer 7 is actuated since during the negative portion of the ignition pulse current flows through buzzer 7, diode 8 and capacitor 9 to ignition primary 2. During this portion of the pulse, capacitor 9 is charged. Once fully charged, capacitor 9 permits buzzer 7 to be heard by an operator since during the positive portion of the ignition pulse current flow will be stopped by diode 8 thus permitting capacitor 9 to discharge through buzzer 7 for a sufficient amount of time to enable buzzer 7 to be heard by an operator. The buzzer makes loud beeps which can be heard above the engine noise as the engine shuts down thus telling the operator of the low oil condition. The above circuitry produces one beep for every ignition pulse i.e. one beep per revolution. Additionally, if the operator tries to restart the engine by pulling a starting rope or cranking a starter motor, there will be a beep for each revolution. Engine 3, of course, will not start, but the operator will immediately know of the abnormally low oil level due to the beeping of buzzer 7. The intermittent beeping of buzzer 7 indicates to an operator that the oil level within crankcase 5 needs to be replenished. After replenishing the oil in crankcase 5, the contacts of switch 6 will open thus allowing engine 3 to be restarted so that normal operation may be resumed.

An ignition powered indicator system for detecting and audibly alerting an operator of the abnormally low level of oil in an engine crankcase associated with an apparatus such as a lawn mower, pump, generator, tractor and the like has been illustrated and described. Numerous different oil level sensors may be incorporated into the system, and numerous types of audio devices may be utilized as an alternative to buzzer 7 specifically described herein.

Various modes of carrying out the invention are contemplated as being within the scope of the following claims particularly pointing out and distinctly claiming the subject matter which is regarded as the invention.

I claim:

1. In an apparatus such as a lawn mower, pump, generator, tractor and the like having an internal combustion engine including a crankcase containing oil and an ignition system having a main core that supports a primary winding to produce an ignition pulse, the improvement of an ignition-powered indicator system for indicating to an operator when the level of oil in the crankcase is too low, comprising:
    indicator means connected in circuit with the primary winding and actuatable to indicate a low oil condition, said indicator means is an audio alterting device, and said indicator means further includes means for producing an intermittent sound from said audio device in timed relation to said primary winding ignition pulse; and
    sensor switch means for sensing the amount of oil in the crankcase, said sensor switch means connected in circuit with said indicator means to actuate said indicator means in response to a change in the amount of oil in the crankcase indicative of an undesirably low oil condition.

2. The improvement of claim 1, wherein said audio alerting device is a buzzer.

3. The improvement of claim 1, wherein said indicator means further includes a diode connected in series circuit between said audio device and said primary winding.

4. The improvement of claim 1, wherein said intermittent sound producing means is a capacitor connected in parallel circuit with said audio device.

5. In an apparatus such as a lawn mower, pump, generator, tractor and the like having an internal combustion engine including a crankcase containing oil and an ignition system having a main core that supports a primary winding to produce an ignition pulse, the improvement of an ignition-powered indicator system for indicating to an operator when the level of oil in the crankcase is too low, comprising:
    indicator means connected in circuit with the primary winding and actuatable to indicate a low oil condition, said indicator means includes an audio alerting device and a diode connected in series circuit with said primary winding, said diode positioned between said audio device and said primary winding having its cathode connected to said primary winding and its anode connected to said audio device, and a capacitor connected in parallel circuit with said audio device for producing an intermittent sound from said audio device in timed relation to said primary winding ignition pulse; and
    sensor switch means for sensing the amount of oil in the crankcase, said sensor switch means connected in series circuit with said audio device and diode to actuate said audio device in response to a change in the amount of oil in the crankcase indicative of an undesirably low oil condition.

6. The improvement of claim 5, wherein said audio device is a buzzer.

* * * * *